United States Patent
Kuhlman et al.

(10) Patent No.: US 8,363,325 B2
(45) Date of Patent: Jan. 29, 2013

(54) DUAL VIEW DISPLAY SYSTEM

(75) Inventors: Frederick F. Kuhlman, Kokomo, IN (US); Andrew P. Harbach, Kokomo, IN (US); Dwadasi H. R. Sarma, Kokomo, IN (US); Michel F. Sultan, Troy, MI (US)

(73) Assignee: Delphi Technologies, Inc., Troy, MI (US)

( * ) Notice: Subject to any disclaimer, the term of this patent is extended or adjusted under 35 U.S.C. 154(b) by 80 days.

(21) Appl. No.: 12/881,242

(22) Filed: Sep. 14, 2010

(65) Prior Publication Data

US 2012/0062999 A1    Mar. 15, 2012

(51) Int. Cl.
    *G02B 27/12*    (2006.01)
(52) U.S. Cl. ........................ 359/639; 345/214
(58) Field of Classification Search .............. 359/639; 345/214
    See application file for complete search history.

(56) References Cited

U.S. PATENT DOCUMENTS

| | | | |
|---|---|---|---|
| 5,686,979 A | | 11/1997 | Weber et al. |
| 5,852,512 A | * | 12/1998 | Chikazawa ............... 359/463 |
| 6,674,504 B1 | | 1/2004 | Li et al. |
| 6,999,649 B1 | | 2/2006 | Chen et al. |
| 2008/0084614 A1 | | 4/2008 | Dobrusskin |
| 2009/0058845 A1 | * | 3/2009 | Fukuda et al. ............. 345/214 |

OTHER PUBLICATIONS

U.S. Appl. No. 12/840,526, filed Jul. 21, 2010, Kuhlman, et al.
U.S. Appl. No. 12/840,576, filed Jul. 21, 2010, Kuhlman, et al.
U.S. Appl. No. 12/852,647, filed Aug. 9, 2010, Kuhlman, et al.

* cited by examiner

*Primary Examiner* — James Jones
(74) *Attorney, Agent, or Firm* — Lawrence D. Hazelton

(57) ABSTRACT

A dual view display system that displays two different images in different directions using a single display device. The dual view display includes a first optical element overlaying a first portion of the pixels and configured to direct light emitted from the first portion of the pixels toward a first direction, a second optical element overlaying a second portion of the pixels and configured to direct light emitted from the second portion of the pixels toward a second direction distinct from the first direction, and an optical barrier arranged between the first optical element and the second optical element effective to prevent light from propagating therebetween.

4 Claims, 4 Drawing Sheets

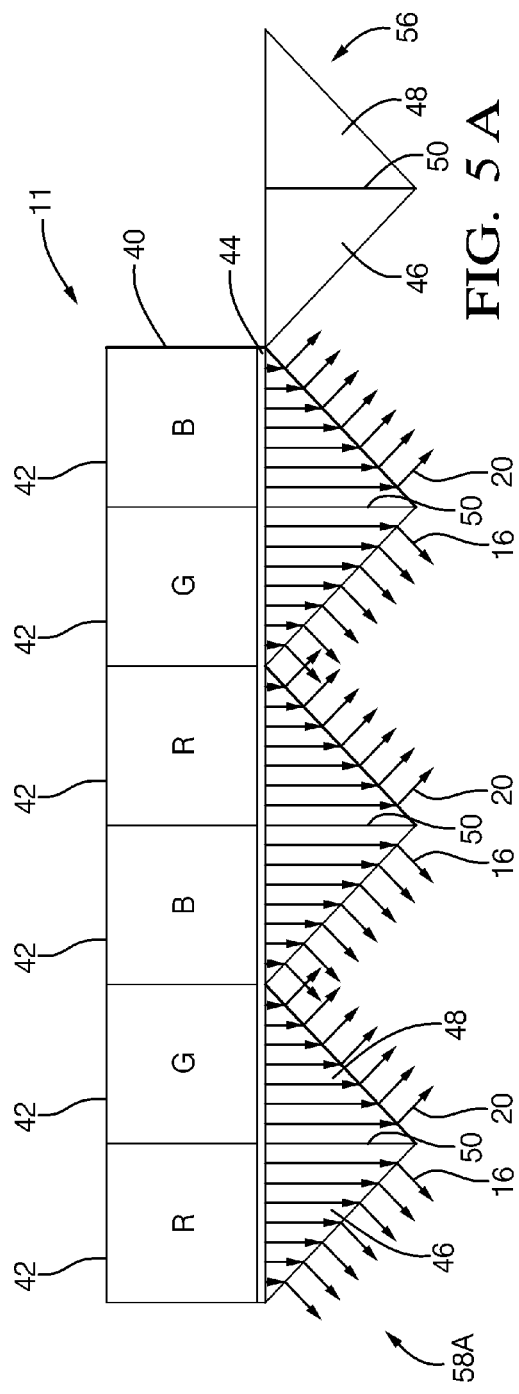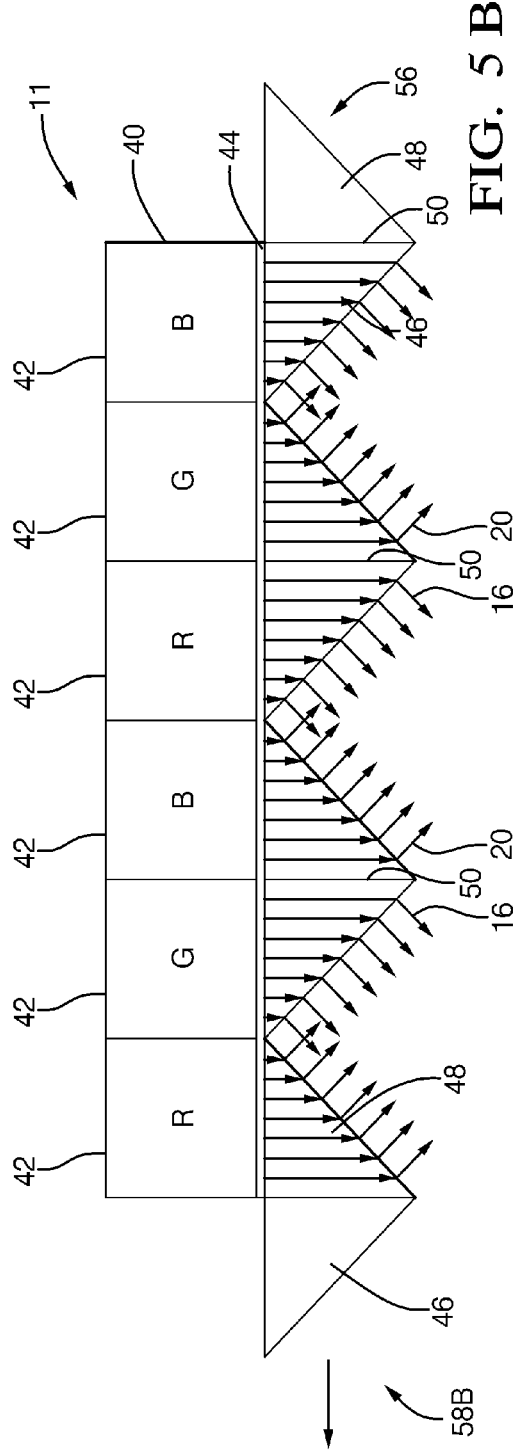

DUAL VIEW DISPLAY SYSTEM

TECHNICAL FIELD OF INVENTION

The invention generally relates to display systems for displaying images or information, and more particularly relates to a dual view display system that displays different images in different directions.

BACKGROUND OF INVENTION

Dual view displays capable of showing different images to distinct persons viewing the display from different directions have been proposed. Such displays can, for example, display navigation information to a vehicle operator while displaying a movie to a passenger. Some of the known dual view displays use a parallax barrier or patterned barrier to allow selected pixels on a display to be viewed from one direction and blocked when viewed from another direction. A description of such displays can be found in United States Patent Application Publication Number 2008/0001849 published Jan. 3, 2008 by Jin et al. and 2008/0061305 published Mar. 13, 2008 by Kim et al. Other dual view displays use a segmented backlighting source that directs light or emits light in a particular direction toward selected pixels by emitting light through apertures. The apertures are aligned with the pixels such that when the selected pixels are viewed from that particular direction, the selected pixels are more apparent than when viewed from another direction. A description of such a display can be found in U.S. Pat. No. 7,671,935 issued on Mar. 2, 2010 to Mather et al. In general, prior art devices rely on parallax angles and interlacing of images to display distinct images in different directions, and so when two images are displayed the resolution of each image is half of the resolution of the display.

SUMMARY OF THE INVENTION

Described herein is a dual view display system that uses an optical barrier to prevent light passing through a first optical element from leaking or propagating into a second optical element.

In accordance with one embodiment of this invention, a dual view display system is provided. The system includes a single display device, a first optical element, a second optical element, and an optical barrier. The display device includes a plurality of pixels configured to control light emission and operable to display images on a display surface. The first optical element overlays a first portion of the pixels and is configured to direct light emitted from the first portion of the pixels toward a first direction. The second optical element overlays a second portion of the pixels and is configured to direct light emitted from the second portion of the pixels toward a second direction distinct from the first direction. The optical barrier is arranged between the first optical element and the second optical element in a manner effective to prevent light from propagating therebetween.

Further features and advantages of the invention will appear more clearly on a reading of the following detailed description of the preferred embodiment of the invention, which is given by way of non-limiting example only and with reference to the accompanying drawings.

BRIEF DESCRIPTION OF DRAWINGS

The present invention will now be described, by way of example with reference to the accompanying drawings, in which:

FIG. 5 (A, B) is a top sectional view of a dual view display of FIG. 1 in accordance with one embodiment.

DETAILED DESCRIPTION OF INVENTION

Figure 1:
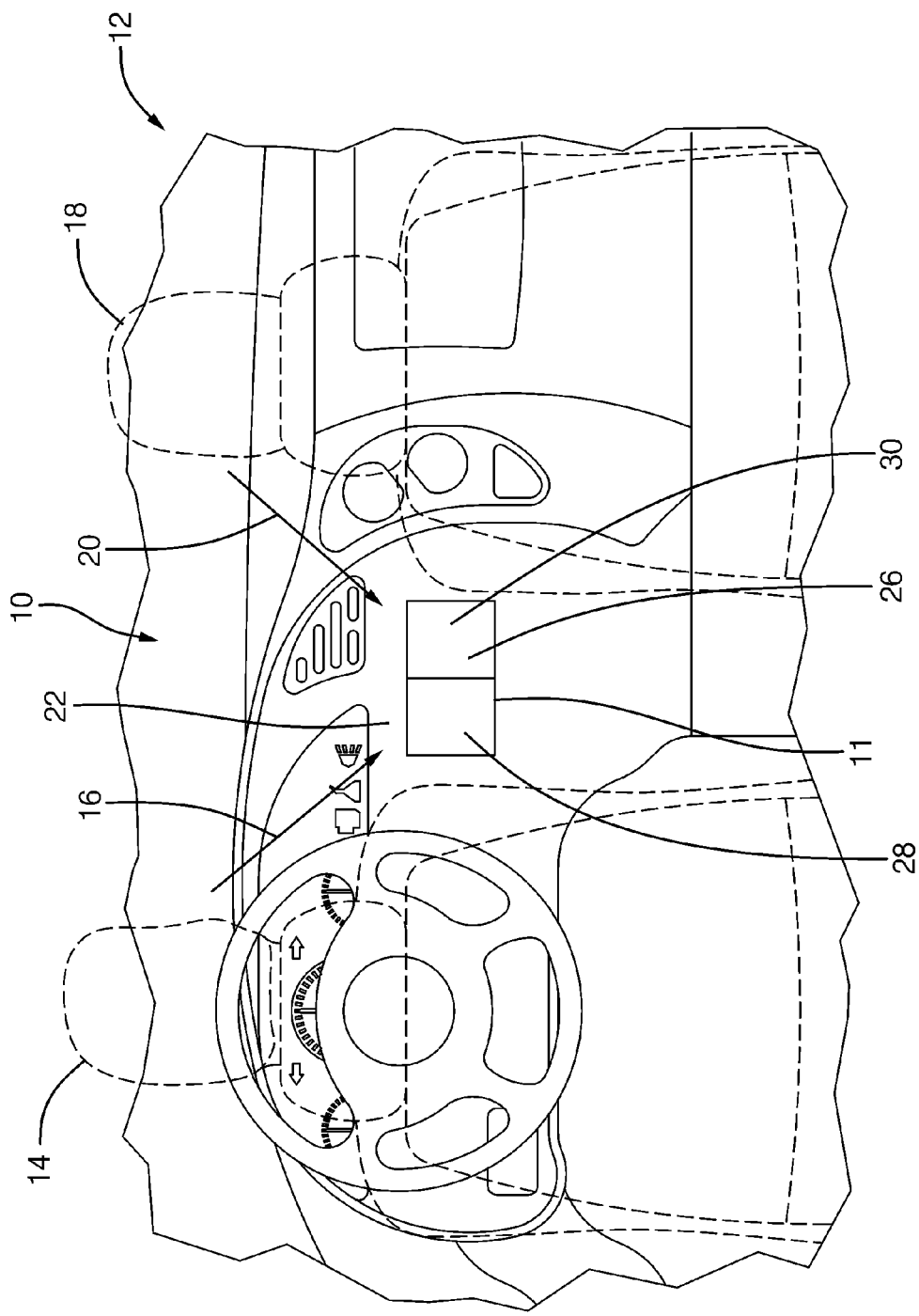
FIG. 1 is a perspective view of vehicle interior equipped with a dual view display system in accordance with one embodiment.
Figure 2:
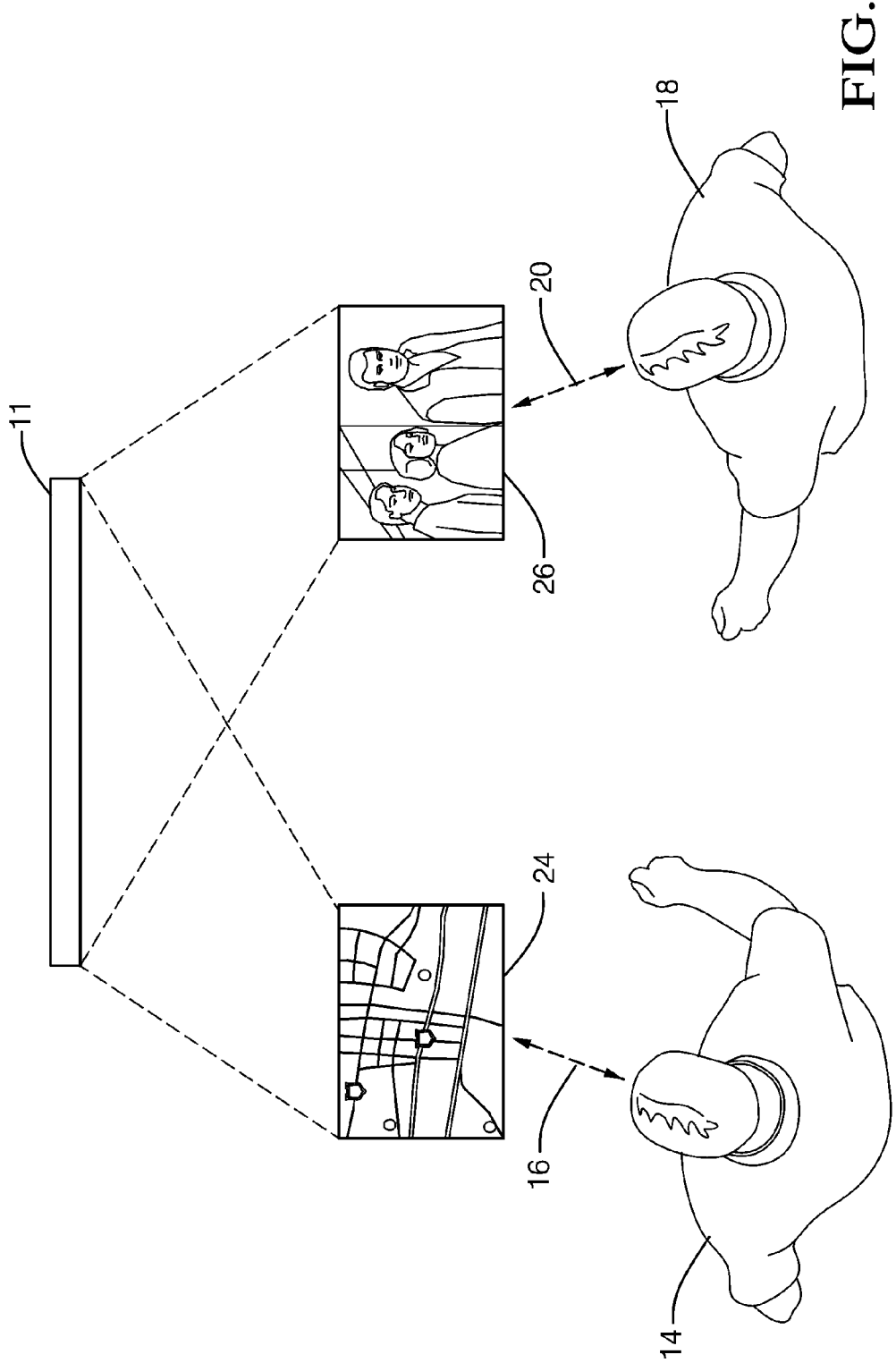
FIG. 2 is a top sectional view of a dual view display of FIG. 1 in accordance with one embodiment.

In accordance with an embodiment of a dual view display system 10, FIGS. 1-2 illustrate a non-limiting example of a vehicle interior 12 equipped with a dual view display 11 located on a dashboard 22. The system 10 in this example is configured so a driver 14 may view a first image 24 from a first direction 16, and a passenger 18 may view a second image 26 different from the first image 24 from a second direction 20 that is different from the first direction 16. Such a dual view display system 10 may, for example, display navigation information as the first image 24 to the driver 14 while also displaying a movie as the second image 26 to the passenger 18. By this arrangement, the system 10 provides two distinct images 24, 26 to distinct viewers 14, 18 by projecting images in two different directions 16, 20 at the same time from the same location on the dashboard 22, As such, the system 10 is distinguished from 3-D display systems that display two similar images for viewing by the same person from the same general direction.

Figure 3:
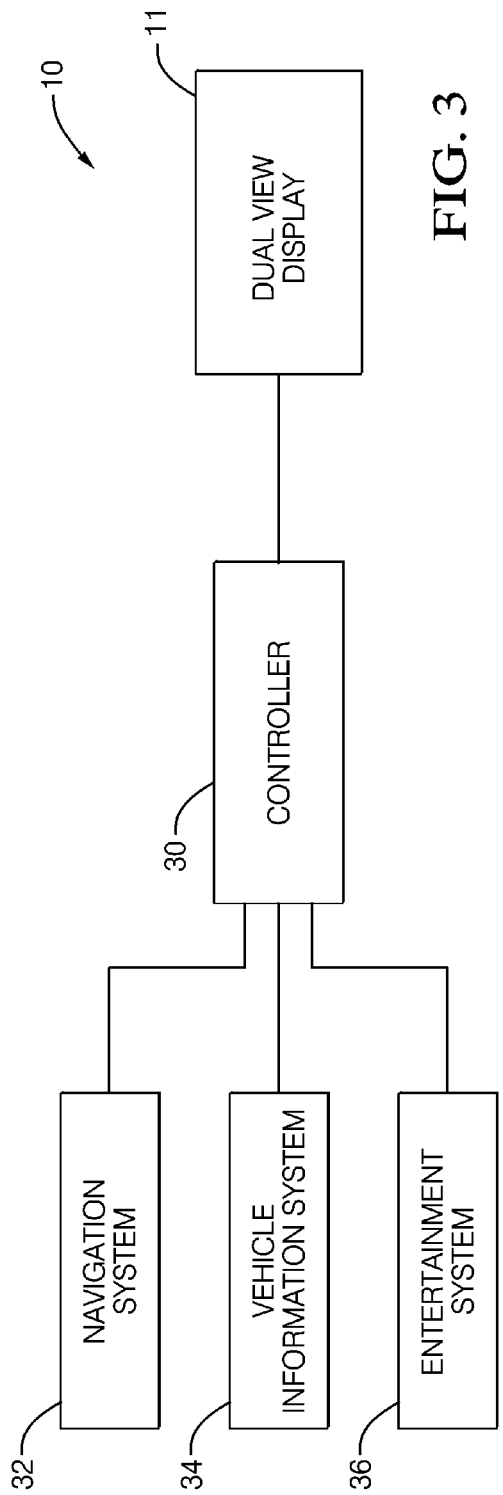
FIG. 3 is a block diagram of the dual view display system of FIG. 1 in accordance with one embodiment.

FIG. 3 illustrates a block diagram as a non-limiting example of the dual view display system 10. The system 10 may include a controller 30 that may include a processor such as a microprocessor or other control circuitry as should be evident to those skilled in the art. The controller 30 may include memory, including non-volatile memory, such as electrically erasable programmable read-only memory (EEPROM) for storing one or more routines and captured data. The one or more routines may be executed by the processor to perform steps for determining if signals are received by the controller 30 for displaying images as described herein. As suggested in the illustration, the controller 30 may receive an image signal from a navigation system 32 that, for example, shows the present geographical location of the system 10. The controller 30 may also receive information regarding vehicle operating status from a vehicle information system 34. The vehicle operating status may include, for example, engine coolant temperature or vehicle interior heating and air conditioning settings. The controller 30 may also receive entertainment information from an entertainment system 36. Entertainment information may include a pre-recorded movie. For reasons of avoiding distracting the driver 14, it may be desirable that the movie information only be displayed to the passenger 18. It will be appreciated that the dual view display system 10 may be used for non-vehicle applications where the controller 30 would receive signals from sources other than the systems 32, 34, and 36 suggested in FIG. 3. It will also be appreciated that the same image could be displayed to both the driver 14 and the passenger 18 so, for example, both persons could view navigational information.

Figure 4:
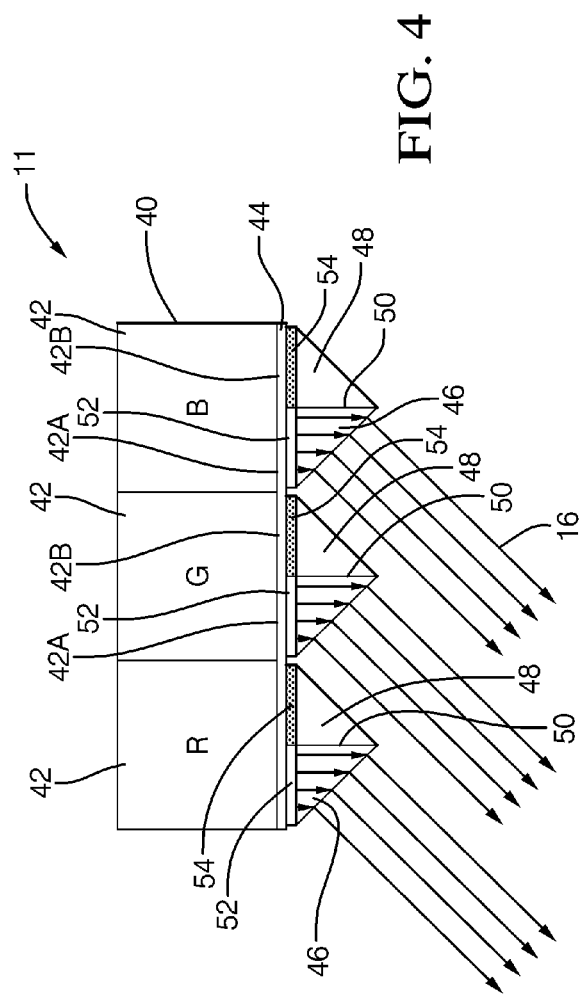
FIG. 4 is a top sectional view of a dual view display of FIG. 1 in accordance with one embodiment.

FIG. 4 illustrates a non-limiting example of an embodiment of a dual view display 11. The dual view display 11 may include a display device 40 formed of a plurality of pixels 42 configured to control light emission and operable to display images on a display surface 44. The display device 40 is illustrated as having three pixels 42, but it will be understood that the display device 40 will normally have many more pixels 42 arranged in a two-dimensional array so that images could be displayed on the display surface 44. For example, the display device 40 may be formed of an array of 1024 by 768 pixels. In general, each pixel 42 is individually controlled so that images can be formed on the display surface 44. Each pixel 42 may be an organic light emitting diode (OLED) type device capable of emitting light having a color, or a liquid crystal display (LCD) type device configured to filter light passing through the pixel so as to have a color. In the non-limiting example illustrated in FIG. 4, the pixels 42 may include a red pixel R, a green pixel G, and/or a blue pixel B.

As illustrated in FIG. 4, the duel view display 11 may include a first optical element 46, a second optical element 48, and an optical barrier 50. The first optical element 46 may be sized to overlay a first portion of the pixels. The first optical element 46 may be formed of a clear material such as glass or polymer. It will be appreciated that the material selected may be selected based on providing a particular index of refraction. Additional information regarding optical elements can be found in U.S. application patent Ser. No. 12/852,647 by Kuhlman, filed Jul. 9, 2010, the entire disclosure of which is hereby incorporated herein by reference. The first optical element 46 is preferably configured to direct light emitted from the first portion of the pixels and passing through the first optical element 46 toward a first direction 16. The duel view display 11 may also include a second optical element 48 overlaying a second portion of the pixels and configured to direct light emitted from the second portion of the pixels toward a second direction 20 distinct from the first direction 16. While the second direction 20 is not specifically shown in FIG. 4, is should be understood that in the same way that the first direction 16 is generally directed toward the driver 14, the second direction 20 is generally directed toward the passenger 18.

The duel view display 11, or system 10, may further include an optical barrier 50 arranged between the first optical element 46 and the second optical element 48. The optical barrier 50 is preferably configured to be effective to prevent light present in the first optical element 46 from propagating into the second optical element 48, and effective to prevent light in the second optical element 48 from propagating into the first optical element 46. As such, the optical barrier 50 prevents light intended to be projected in the first direction 16 from being projected in another direction, for example the second direction 20. The optical barrier may be a layer of metal deposited on a surface of either optical element 46, 48, or may be a layer of opaque material such as a polymer.

FIG. 4 illustrates one embodiment of the dual view display 11 where the first optical element 46 overlies a first pixel portion 42A of each pixel 42 and the second optical element overlies a second pixel portion 42B of each pixel 42. The dual view display 11 in this embodiment may also include a first shutter device 52 arranged between the first pixel portion 42A and the first optical element 46, and a second shutter device 54 arranged between the second pixel portion 42B and the second optical element 48. The first shutter device 52 and the second shutter device 54 are generally operable to a transparent state and an opaque state. Such operation may be provided, for example, by a liquid crystal display (LCD) element. FIG. 4 illustrates the first shutter device 52 as being in the transparent state by the indication of light passing from each pixel 42 through the first optical element 46 and projecting in the first direction 16. The second shutter device 54 is illustrated as being in the opaque state by the lack of light passing from each pixel 42 into the second optical element 48.

With the first and second shutter devices 52, 54 in the states illustrated, the first image 24 can be displayed on the display surface 44 and projected toward the driver 14. It will be appreciated that the states of the first and second shutter devices 52, 54 could both be changed and the second image 26 could be displayed on the display surface 44 so that the second image 26 would be projected through the second optical element 48 and toward the passenger 18. If the two conditions described here are alternated rapidly, 30 times per second for example, the first and second images 24, 26 would be projected in distinct directions so the driver 14 and passenger 18 could each view distinct images. By this arrangement of first and second optical elements overlaying a portion of each pixel 42, the image displayed in distinct directions 16, 20 would have the same resolution as the display device 44.

In another embodiment not illustrated, the first optical element 46 and second optical element 48 could be sized to overlay one or more adjacent pixels 42, for example a single group of pixels, each group having a red pixel R, a green pixel G, and a blue pixel B. The advantage of such an arrangement is that each optical element 46, 48 is generally larger and therefore presumably easier to manufacturer. Also, the shutter devices 52, 54 are unnecessary as the first and second images 24, 26 can be interlaced on the display device 44. The disadvantage of such an arrangement is that the resolution of each image is about half of the resolution of the display device 44. The optical barrier 50 is still a useful feature to prevent light from propagating between the optical elements 46, 48.

FIGS. 5A and 5B illustrate another non-limiting example of an embodiment of a dual view display 11. The dual view display 11 may include a display device 40 formed of a plurality of pixels 42 configured to control light emission and operable to display images on a display surface 44 as described above in regard to FIG. 4. In this embodiment the first optical element 46 and the second optical element 48 are sized to substantially each overlay a single pixel 42.

The arrangement of the first optical element 46, the second optical element 48, and the optical barrier 50 may be described as forming an optical assembly 56. The optical assembly 56 is preferably configured to be movable relative to the display device 40. As illustrated in FIGS. 5A and 5B, the optical assembly 56 may be movable to a first position 58A corresponding to FIG. 5A, whereby the first optical element 46 overlies a specific pixel, and a second position 58B corresponding to FIG. 5B, whereby the second optical element 48 overlies the same specific pixel. By moving the optical assembly 56 between the first position 58A and the second position 58B, and simultaneously alternating the interlacing of the first and second images 24, 26 between, for example, even and odd numbered pixels, two images can be projected in distinct directions 16, 20.

The advantage of such an arrangement is that all of the light emitted by the display device is used to project the first and second image. Furthermore, if the optical assembly 56 is moved rapidly between the first position 58A and the second position 58B rapidly, 30 times per second for example, the apparent resolution of the first image 24 and the second image 26 will be that of the display device. The movement of the optical assembly 56 may be performed by an actuator that is not specifically shown, but is suggested by an arrow 60. The actuator may be coupled to the optical assembly 56 in a manner effective to move the optical assembly between the first position 58A and the second position 58B. The actuator may be an electromagnetic device such as a solenoid, or may be a piezoelectric device, and may be coupled to the optical assembly 56 in a number a ways that will be readily apparent to those skilled in the mechanical arts.

It will be appreciated that the actuator is not necessary if it is acceptable to display images having lower resolution than the resolution provided by the display device. For example, a dual view display without the actuator may be used to provide two images where each image has a resolution that is about half of the resolution of the display device 40. It will also be appreciated that the optical elements can be sized to each overlay more than one pixel and thereby presumably make the manufacturing of the optical assembly 56 simpler since in general the features are lager. Furthermore, the system 10 may include a third optical element (not shown) configured to project light in a third direction, for example approximately between the first direction 16 and the second direction 20 toward a second passenger (not shown) seated between the driver 14 and the passenger 16. Such an arrangement may include a second optical barrier and/or a third shutter device.

Accordingly, a dual view display system 10 for displaying different images in different directions is provided. By using a first optical element 46 and a second optical element 48 that are arranged in close proximity to each other, but are optically isolated by an optical barrier 50, a system 10, or a dual view display 11, that displays or projects distinct images in distinct directions is provided for less cost than separate displays for each image/direction. In the specific example embodiments described herein, the full resolution of the display device is maintained for both images, unlike the parallax based dual view display devices that halve the resolution of each image relative to the resolution of the display to display two distinct images. However, it is recognized that the arrangement of first and second optical elements optically isolated by the optical barrier could be advantageously used in a manner that does not provide distinct images having the same resolution as the single display device used to display the images.

While this invention has been described in terms of the preferred embodiments thereof, it is not intended to be so limited, but rather only to the extent set forth in the claims that follow.

We claim:

1. A dual view display system comprising:
    a single display device comprising a plurality of pixels configured to control light emission and operable to display images on a display surface;
    a first optical element characterized as a first prism element overlaying a first portion of the pixels and configured to direct light emitted from the first portion of the pixels toward a first direction;
    a second optical element characterized as a second prism element distinct from the first prism element, said second optical element overlaying a second portion of the pixels and configured to direct light emitted from the second portion of the pixels toward a second direction distinct from the first direction; and
    an optical barrier arranged between the first optical element and the second optical element effective to prevent light from propagating therebetween, wherein the first optical element overlies a first pixel portion of each pixel and the second optical element overlies a second pixel portion of each pixel such that light from each pixel can be directed in the first direction and the second direction, wherein the system further comprises a first shutter device arranged between the first pixel portion and the first optical element and a second shutter device arranged between the second pixel portion and the second optical element.

2. The system in accordance with claim 1, wherein the display device is characterized as having a display resolution, and the system is configured such that a first image projected in the first direction and a second image projected in the second direction are each characterized has having the display resolution.

3. The system in accordance with claim 1, wherein the first optical element, the second optical element, and the optical barrier form an optical assembly that is movable to a first position whereby the first optical element overlies a pixel, and a second position whereby the second optical element overlies the same pixel.

4. The system in accordance with claim 3, wherein the system further comprises an actuator coupled to the optical assembly effective to move the optical assembly between the first position and the second position.

* * * * *